Figure 2:
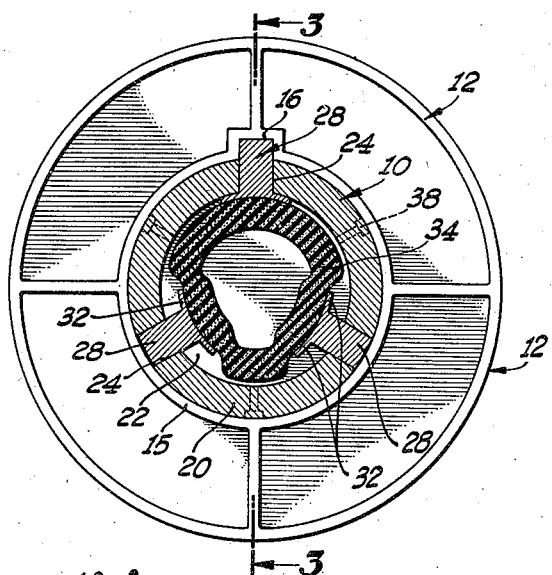

Nov. 11, 1947.   A. BARSAM, JR   2,430,598
SPINDLE
Filed July 26, 1944

INVENTOR.
ARTHUR BARSAM, JR.,
BY
ATTORNEY.

Patented Nov. 11, 1947

2,430,598

UNITED STATES PATENT OFFICE 2,430,598

SPINDLE

Arthur Barsam, Jr., Los Angeles, Calif.

Application July 26, 1944, Serial No. 546,699

1 Claim. (Cl. 242—70)

This invention relates to the film mounting mechanism of cameras and other photographic equipment and has for its general object the provision of means enabling film manufactured by various makers to be used interchangeably in such equipment.

It is customary to sell lengths of cinema film ready wound upon a spool which is adapted to fit upon a spindle mounted in the film magazine of the camera. Some makes of camera are provided with spindles located in the film magazine which fit spools of one configuration, while other camera manufacturers supply their cameras with spindles which fit spools of another configuration.

The most common type of film spool is one formed as a light drum supported by a spider from a centrally arranged tubular hub provided either with an inwardly projecting key, or with a keyway. The spindle on which the spools of the first type are mounted must therefore provide a groove to receive the spool key, and spindles adapted to use with the second type of spool must have a key to enter the keyway in the spool hub. The inside diameter of both forms of spool is usually the same.

The necessity of purchasing spools of a form adapted to fit the particular type of spindle mounted in a camera or magazine is inconvenient, and the principal object of my invention is to provide a spindle adapted to receive either of the types of spool hub above described.

Another object of the invention is to provide a spindle construction of the kind described which is simple and inexpensive to manufacture yet effective in operation.

A further object of the invention is to provide a spindle construction which can be used to mount either type of film spool by merely pushing the spool thereon so that the key or keyway on the inner periphery of the spool registers with a slot or key on the periphery of the spindle, resulting in interlocking engagement of the parts.

Still further features and objects of my invention will appear in the following description taken in conjunction with the accompanying drawings in which a preferred embodiment of my invention is illustrated. It will be understood that the scope of the invention is not in any way limited by the illustrative showing thereof herein, but only as defined by the apended claim.

Figure 3:
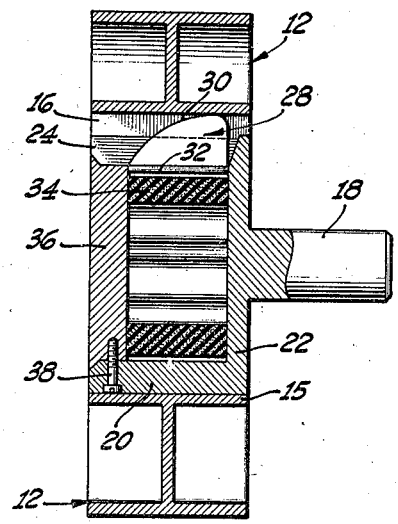
Figure 1:
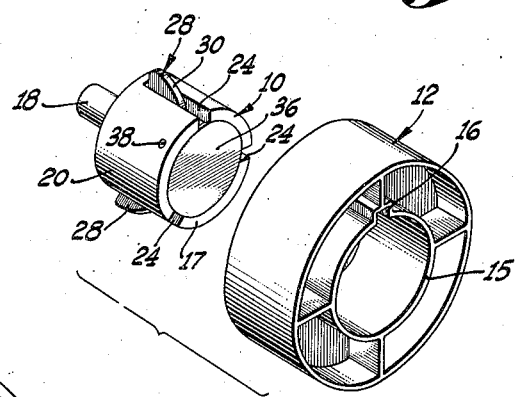
Figure 4:
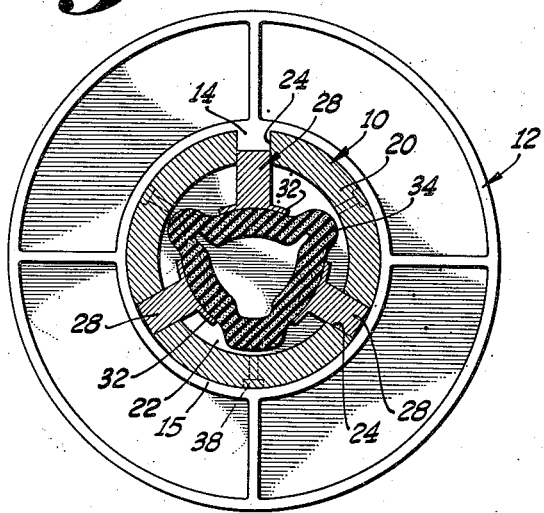

In the drawings, in which identical numerals indicate identical parts:

Fig. 1 is an exploded perspective view of a preferred form of spindle embodying my invention and of a film spool provided with a keyway in the inner surface of its tubular hub, Fig. 2 is a front elevation to an enlarged scale of the spool shown in Fig. 1 mounted on the spindle which is shown in cross-section, Fig. 3 is a cross-section taken on the line 3—3 of Fig. 2, and Fig. 4 is a view similar to Fig. 2, but showing a film spool mounted on the spindle and provided with a key projecting from the inner surface of the tubular hub.

In the drawings, the numeral 10 indicates generally the spindle construction of my invention in assembled condition, and the numeral 12 indicates a conventional film spool which in this case is provided with a keyway 16.

In the form of my invention illustrated herein, the spindle construction includes a shaft 18 preferably formed integral with a coaxial drum 20 having its rear end closed by a wall 22 and its front end open and adapted to be closed by a removable plate 36 to be described in detail later. The outside diameter of the drum is such as to fit snugly within the central tubular hub 15 of a film spool, such spools, as before described, usually being standardized as to the internal diameter of the tubular hub portion.

The periphery of the drum 20 is provided with a plurality of longitudinal slots 24 preferably extending through the edge of the drum, thus leaving the ends of the slots open at the open end of drum 20. I prefer to provide three of the slots 24 as shown in the drawing and to space the slots equally around the circumference of the drum, since this arrangement provides a better support for the film spool.

In each of the slots 24, spool engaging members 28 are arranged to have a limited sliding movement in a radial direction. Members 28 are plate-like in form and have their outer edges curved as indicated at 30. On their inner ends, the members 28 are provided on each side with laterally projecting flanges 32 which act to limit the outward movement of members 28 by engaging against the inner periphery of the drum, and also serve to form footings supported on a resilient member 34.

In the form of the invention illustrated, the resilient member 34 is formed as an annulus of rubber or synthetic rubber of sufficient axial length to afford adequate support to the footings 32 of members 28, the thickness of the annulus being such that the members 28 are pressed outwardly with considerable force.

The open end of the drum 20 is closed by a plate 36 inserted into the drum and retained in position by screws 38 passing through the peripheral wall of the drum and engaging in tapped bores in the periphery of the plate. The axial length of the members 28 is such that they are guided by sliding radially between the spaced parallel inner faces of wall 22 and plate 36.

When a keyway type of film spool such as shown in Figs. 1-3 is mounted on the spindle of my invention, the keyway 16 is preferably aligned with one of the spool-engaging members 28 (see Fig. 1) and the spool is then slid onto the drum 20. The member 28 which is aligned with the spool keyway 16 slides into the keyway and normally is not depressed since the keyway is usually deeper than the member 28 (see Fig. 2). The other two members 28 are, however, depressed by engagement with the hub 15 of the spool and assume the positions shown in Fig. 2, wherein it will be seen that they have deformed the resilient annulus 34. If in mounting the spool on the spindle, the keyway 16 is not first aligned with a member 28, the spool can nevertheless be slipped onto the drum, the only difference being that all three of the members 28 are depressed. However, the spool can then be rotated on the drum 20 until one of the members 28 comes abreast of the keyway 16, whereupon the member 28 will be forced outwardly into the keyway by the resilience of the annulus 34 to securely lock the parts as before.

When a key type film spool such as illustrated in Fig. 4 is mounted on my spindle, it is necessary (if the key 14 comes to the outer edge of the hub 15) to align the key with one of the slots 24 before sliding the spool onto the spindle drum. With the parts in aligned position, the key 14 will slide into its appropriate slot 24 depressing the member 28 in that slot to an extreme contracted position as seen in Fig. 4. The other two members 28 will also be depressed, but to a lesser degree, by engagement with the hub 15 as before. Consequently, the spool is firmly locked on the spindle by engagement of the key 14 in one of the slots 24. In those cases where the key 14 does not extend to the edge of the tubular hub 15, the spool can be partially slid on the spindle and then rotated to align the spool key with a spindle slot.

While the particular apparatus herein shown and described in detail is fully capable of attaining the objects and providing the advantages hereinbefore stated, it is to be understood that it is merely illustrative of the presently preferred embodiment of my invention, and that I do not mean to limit myself to the details of construction or design herein shown, other than as defined in the appended claim.

I claim:

A spindle for film spool comprising a cylindrical body closed at one end and formed with circumferentially spaced slots open at the open end of said body, a shaft extended centrally from the closed end of said body, a relatively strong resilient cylinder inside said cylindrical body, a spool-engaging key having a cammed end slidably positioned in each of said slots and formed with widened curved feet extended the length of said resilient cylinder and in contact with the exterior thereof, said feet limiting the outward radial movement of said key upon contact with the inner surface of said cylindrical body, and a closure plate closing the end of said cylindrical body opposite said closed end and leaving open the ends of said slots, characterized in that said spindle is adapted to seat a spool with a key extended into one of said slots and is also adapted to seat a spool formed with a keyway, one of said keys projecting through one of said slots and into said keyway.

ARTHUR BARSAM, Jr.

REFERENCES CITED

The following references are of record in the file of this patent:

UNITED STATES PATENTS

| Number | Name | Date |
| --- | --- | --- |
| 2,131,130 | Wilson | Sept. 27, 1938 |
| 1,297,809 | Dixon | Mar. 18, 1919 |
| 1,980,468 | Brauer | Nov. 13, 1934 |
| 2,215,069 | Meisel | Sept. 17, 1940 |
| 2,274,681 | Fletcher | Mar. 3, 1942 |
| 1,918,518 | Carter | July 18, 1933 |
| 1,956,193 | Gollong | Apr. 24, 1934 |

FOREIGN PATENTS

| Number | Country | Date |
| --- | --- | --- |
| 500,116 | Great Britain | Jan. 30, 1939 |